Patented Mar. 7, 1933

1,900,660

UNITED STATES PATENT OFFICE

ANTON RUDOLPH PAWLITSCHKO, OF LITTLE FERRY, NEW JERSEY, ASSIGNOR TO WESTERN NEWSPAPER UNION, A CORPORATION OF DELAWARE

MATRIX BOARD FOR STEREOTYPING

No Drawing.   Application filed October 13, 1930.   Serial No. 488,543.

This invention relates to the preparation of matrix board or flong for use in the sterotyping process and as an incident thereto to a preparation used in coating such matrix boards.

In the usual process of stereotyping, a positive imprint is formed from an appropriately shaped die in specially prepared paper which is moistened to receive the imprint. This paper is called the matrix board and is later put in a casting machine where it is held in appropriate circular form and the metal to be used for the printing plate is cast against it. Due to the heat of the metal, the paper is rapidly dried out and soon begins to carbonize so that it is only possible to make a small number of castings from a single sheet, and even these are somewhat rough and indistinct.

I have discovered that by giving the usual prepared paper a particular coating before it is imprinted, the life of the matrix can be extended so that more than 100 printing plates can be made from a single matrix and the quality of these is vastly improved.

I have found that the best way to coat the matrix board is by a preparation of graphite which will penetrate the paper and which will harden to such an extent that the graphite will not rub off, but which will not render the paper brittle and will permit the paper to be resoftened for use, by moistening.

To prepare this coating I start with substantially colloidal graphite prepared in a paste which will disseminate in water. Such a paste can now be bought in the open market. This paste is thinned out, as for example in the proportion of using one pint of the thick paste and enough water to bring the total up to 2 gallons, but this can be varied to suit the requirements. I have found that such a dispersion of graphite can be made available to supply a permanent coating if there is combined with it a properly prepared resinous material thoroughly disseminated through the water, and I have found that this result can be accomplished by dissolving the resin in a vehicle which is miscible with water and then adding the dissolved resin to the graphite suspension. The resin should be in a very thin solution. When added to a large volume of water the resin normally would precipitate but apparently in the presence of the colloidal graphite it stays in suspension either as separate colloidal particles or as surface coatings on the colloidal particles of the graphite. Thus, for example, I can take one and one-half ounces of dry orange shellac and dissolve this thoroughly in six ounces of ordinary denatured alcohol and after the solution is complete, add this to the two gallons of graphite suspension referred to above. In place of shellac other natural or synthetic resins soluble in alcohol can be used, such for example as resins prepared from phenol and formaldehyde, but the resin should be one which is hard at normal temperatures. I also believe that a similar result can be obtained by forming a dispersion of the resin in water directly by use of a colloid mill, following the procedure now known in the art, and mixing this with the suspension of graphite, but I find that the method of using a solution of the resin as specified to be simple and efficient. The resulting liquor will apparently keep a long time without settling, though if exposed to the air it will tend to form a tough skin over the surface which later must be removed.

The coating preparation as prepared above is applied to one face of the paper in any desired way as for example by brushing. For volume production, I have found that the most efficient way is to pass the sheets of paper through a pair of rolls, one of which is covered with felt and dips into a vessel containing the liquid. The liquid penetrates the paper to a substantial depth and further will bond with itself completely so that as many coats as desired may be applied. Using a pair of rolls such as I have suggested I have found that satisfactory results can be had by applying from three to five coats. After coating the paper I prefer not to let it dry out as it is to be used in a moistened state. To keep it in proper condition, a number of sheets of the paper can be formed in a stack and these wrapped with a waterproofing agent such as wax paper, in which state they will keep for a long time. If the paper does become dried out it can be moistened from the back and brought back to proper condition by being kept from twenty-four to forty-eight hours in a humidifier. Paper thus prepared will take an exceedingly fine imprint as the coating gives a better texture to the surface and the coating serves to insulate the paper so that a very large number of plates may be cast from a single matrix.

It is understood that the particular proportions given above are intended only by way of example and that the same can be modified in many particulars without departing from the spirit of my invention.

What I claim is:

1. The process of preparing matrix boards of the type used in stereotyping, which comprises the step of impregnating the surface of matrix paper with a suspension in water of graphite and a resinous material which is hard at normal temperatures.

2. The process of preparing matrix boards for use in the stereotyping process which comprises adding an alcohol solution of a normally hard resin to a suspension of graphite in water and coating a surface of the matrix board with the resulting product.

3. As a new product, a paper matrix board of the type used in the stereotyping process having a surface impregnated with finely divided graphite, and a resinous binder therefor.

In testimony that I claim the foregoing, I have hereunto set my hand this 10th day of October, 1930.

ANTON RUDOLPH PAWLITSCHKO.